United States Patent
Wang et al.

(10) Patent No.: US 10,838,054 B2
(45) Date of Patent: Nov. 17, 2020

(54) DETECTION SYSTEM AND METHOD

(71) Applicant: Aptiv Technologies Limited, St. Michael (BB)

(72) Inventors: Yu Wang, Troy, MI (US); Liang Ma, Rochester Hills, MI (US)

(73) Assignee: Aptiv Technologies Limited, St. Michael (BB)

( * ) Notice: Subject to any disclaimer, the term of this patent is extended or adjusted under 35 U.S.C. 154(b) by 186 days.

(21) Appl. No.: 16/154,848

(22) Filed: Oct. 9, 2018

(65) Prior Publication Data

US 2020/0110163 A1   Apr. 9, 2020

Related U.S. Application Data

(60) Provisional application No. 62/742,646, filed on Oct. 8, 2018.

(51) Int. Cl.
| | |
|---|---|
| *G01S 13/08* | (2006.01) |
| *G01S 13/04* | (2006.01) |
| *G01S 13/931* | (2020.01) |

(52) U.S. Cl.
CPC .............. *G01S 13/08* (2013.01); *G01S 13/04* (2013.01); *G01S 13/931* (2013.01); *G01S 2013/93272* (2020.01)

(58) Field of Classification Search
CPC combination set(s) only.
See application file for complete search history.

(56) References Cited

U.S. PATENT DOCUMENTS

| | | | | |
|---|---|---|---|---|
| 9,211,889 | B1* | 12/2015 | Hoetzer | B60Q 5/006 |
| 2014/0277942 | A1* | 9/2014 | Kyrtsos | B60W 10/20 |
| | | | | 701/41 |
| 2014/0303849 | A1* | 10/2014 | Hafner | B60W 50/14 |
| | | | | 701/42 |

(Continued)

FOREIGN PATENT DOCUMENTS

| | | |
|---|---|---|
| EP | 2983006 A1 | 2/2016 |
| EP | 3267222 A1 | 1/2018 |
| EP | 3291205 A1 | 3/2018 |

OTHER PUBLICATIONS

European Search Report for Application No. 19199564, European Patent Office, dated Feb. 20, 2020.

(Continued)

*Primary Examiner* — Mamadou L Diallo
(74) *Attorney, Agent, or Firm* — Colby Nipper PLLC

(57) ABSTRACT

A detection system includes a radar-unit and a controller-circuit. The radar-unit is configured to detect objects proximate a host-vehicle. The controller-circuit is in communication with the radar-unit and is configured to determine a detection-distribution based on the radar-unit. The detection-distribution is characterized by a longitudinal-distribution of zero-range-rate detections associated with a trailer towed by the host-vehicle. The controller-circuit is further configured to determine a trailer-classification based on a comparison of the detection-distribution and longitudinal-distribution-models stored in the controller-circuit. The trailer-classification is indicative of a dimension of the trailer. The controller-circuit determines a trailer-length of the trailer based on the detection-distribution and the trailer-classification.

15 Claims, 7 Drawing Sheets

(56) References Cited

U.S. PATENT DOCUMENTS

| | | | |
|---|---|---|---|
| 2016/0041258 A1* | 2/2016 | Cashler | G01S 7/521 |
| | | | 342/70 |
| 2016/0084943 A1* | 3/2016 | Arage | G01S 13/42 |
| | | | 342/102 |
| 2017/0242443 A1* | 8/2017 | Schuh | G06K 9/00791 |
| 2017/0363728 A1* | 12/2017 | Prasad | B60W 40/12 |
| 2018/0011172 A1* | 1/2018 | Cashler | G01S 13/72 |
| 2018/0045823 A1* | 2/2018 | Prasad | G01S 13/42 |
| 2018/0061239 A1* | 3/2018 | Prasad | G06K 9/00805 |
| 2018/0068566 A1* | 3/2018 | Prasad | B60W 30/10 |
| 2018/0203106 A1* | 7/2018 | Di | G01S 13/931 |
| 2019/0086204 A1* | 3/2019 | Critchley | B60D 1/245 |
| 2019/0232964 A1* | 8/2019 | Lindholm | G06T 7/50 |
| 2019/0308473 A1* | 10/2019 | Yu | B60D 1/363 |
| 2019/0335100 A1* | 10/2019 | Chen | B60R 1/00 |
| 2019/0347498 A1* | 11/2019 | Herman | G06T 7/11 |
| 2020/0079165 A1* | 3/2020 | Niewiadomski | B60D 1/36 |
| 2020/0081117 A1* | 3/2020 | Flores Tapia | G01S 7/415 |
| 2020/0256953 A1 | 8/2020 | Wang et al. | |

OTHER PUBLICATIONS

U.S. Appl. No. 62/593,418 Title: Detection System filed Dec. 1, 2017.

* cited by examiner

DETECTION SYSTEM AND METHOD

TECHNICAL FIELD OF INVENTION

This disclosure generally relates to a detection system, and more particularly relates to a detection system that determines a trailer-length.

BRIEF DESCRIPTION OF DRAWINGS

The present invention will now be described, by way of example with reference to the accompanying drawings, in which.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1:
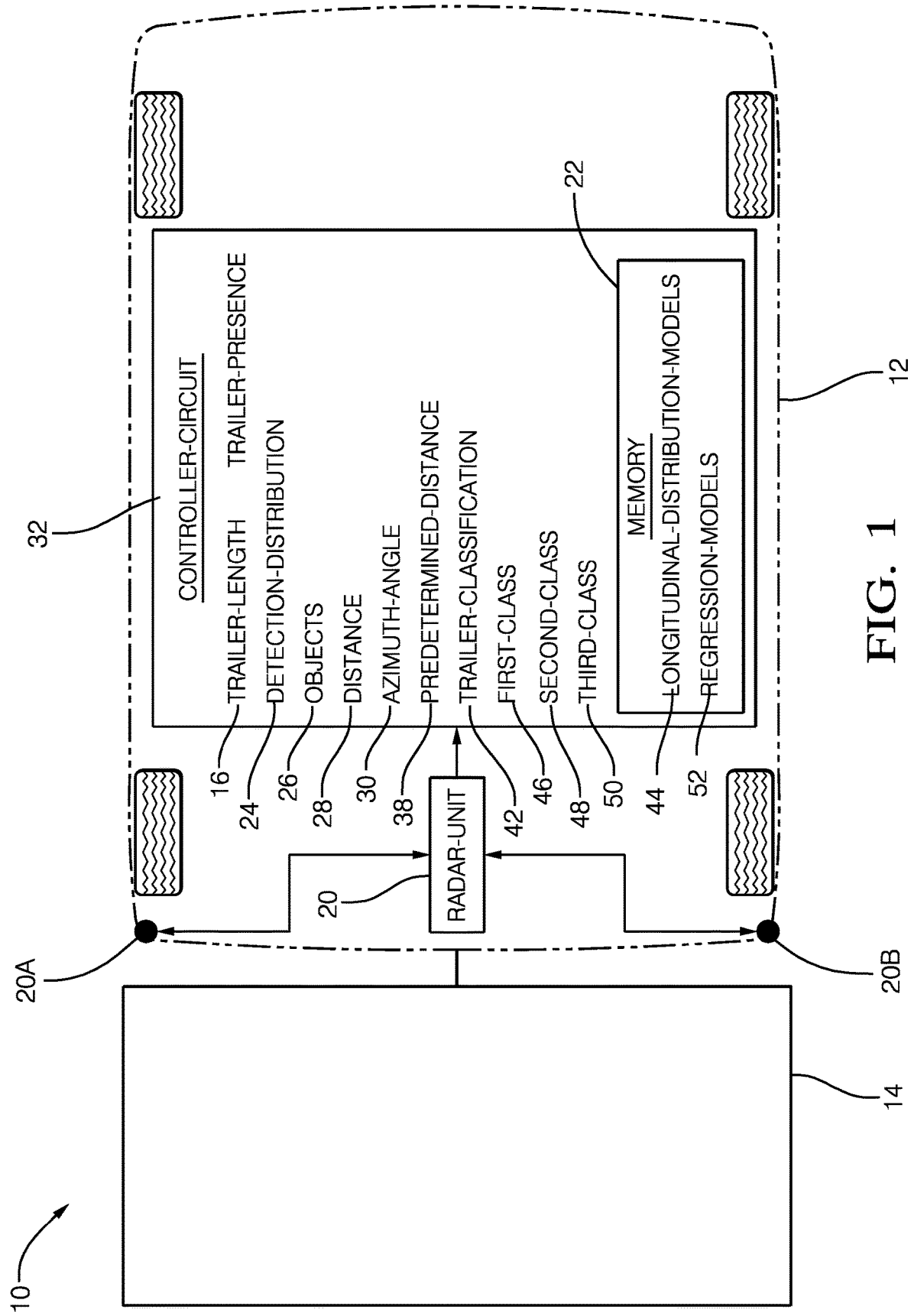
FIG. 1 is an illustration of a detection system in accordance with one embodiment.

FIG. 1 illustrates a non-limiting example of a detection system 10, hereafter referred to as the system 10, installed on a host-vehicle 12 towing a trailer 14. As will be described in more detail below, the system 10 in an improvement over other detection systems because the system 10 estimates a trailer-length 16 based on detected targets by classifying a distribution of data points and performing a regression on the distribution of the data points. The system 10 provides the technical benefit of enabling an adjustment of a blind-zone (not shown) of the host-vehicle 12 based on a size of the trailer 14, improving safety for the driver and other vehicles. In one embodiment, the trailer 14 is a cargo-trailer that may be an enclosed-type with solid panels, while in another embodiment the cargo-trailer is an open-type with an exposed frame. In yet another embodiment the trailer 14 is a boat-trailer. In yet another embodiment the trailer 14 is a travel-trailer.

Figure 2:
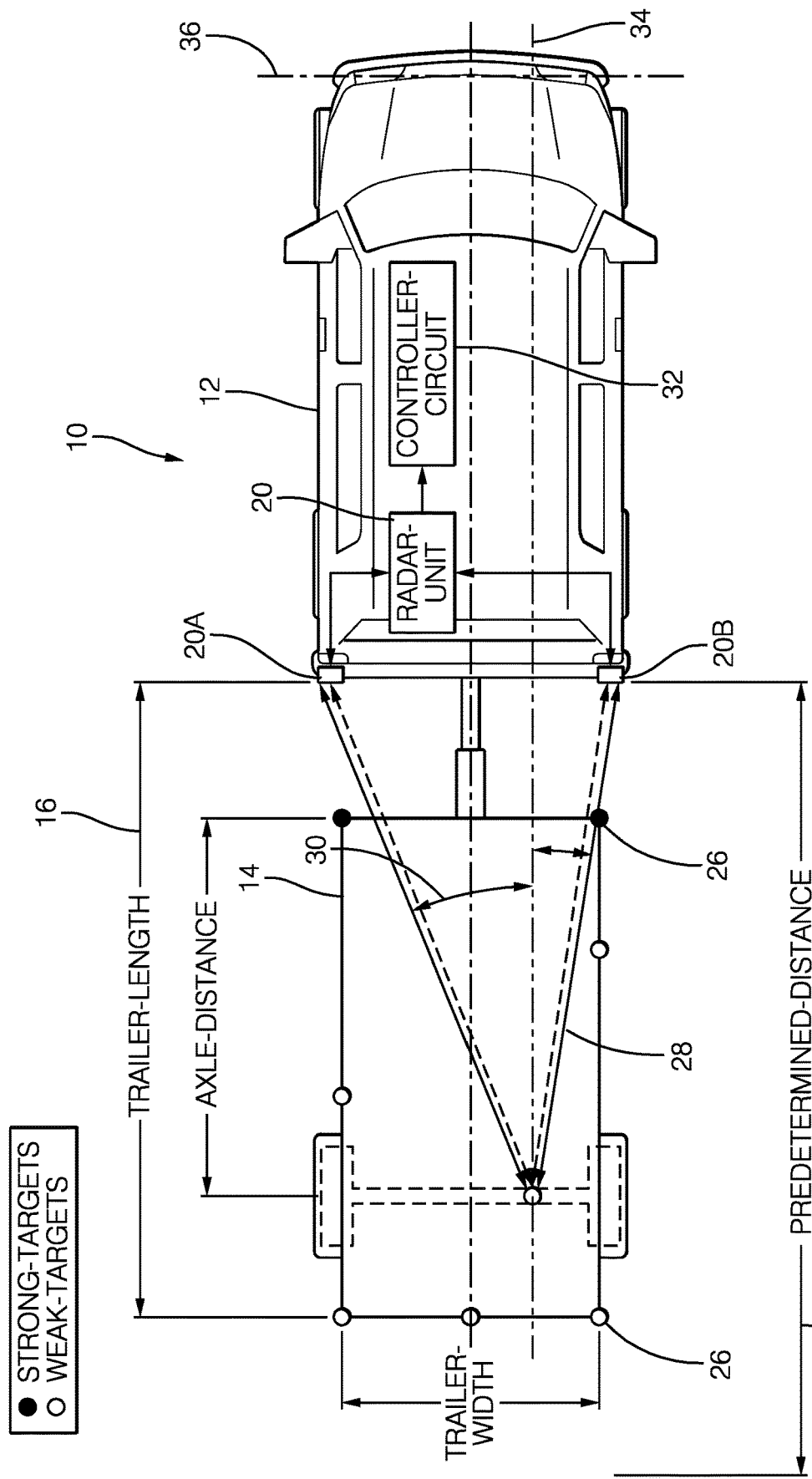
FIG. 2 is an illustration of the detection system of FIG. 1 in accordance with one embodiment.

The system 10 includes a radar-unit 20. The radar-unit 20 is configured to detect objects 26 proximate the host-vehicle 12. The radar-unit 20 detects a radar-signal that is reflected by the features of the trailer 14 towed by the host-vehicle 12, as illustrated in FIG. 2. Typical radar-systems on vehicles are capable of only determining a distance 28 (i.e. range) and azimuth-angle 30 to the target so may be referred to as a two-dimensional (2D) radar-system. Other radar-systems are capable of determining an elevation-angle to the target so may be referred to as a three-dimensional (3D) radar-system. In the non-limiting example illustrated in FIG. 1, the 2D radar-unit 20 includes a left-sensor 20A and a right-sensor 20B. A radar sensor-system with a similarly configured radar-unit 20 is available from Aptiv of Troy, Mich., USA and marketed as an Electronically Scanning Radar (ESR) or a Rear-Side-Detection-System (RSDS). It is contemplated that the teachings presented herein are applicable to radar-systems with one or more sensor devices. It is also contemplated that the teachings presented herein are applicable to both 2D radar-systems and 3-D radar-systems with one or more sensor devices, i.e. multiple instances of the radar-unit 20. The radar-unit 20 is generally configured to detect the radar-signal that may include data indicative of the detected-target present on the trailer 14. As used herein, the detected-target present on the trailer 14 may be a feature of the trailer 14 that is detected by the radar-unit 20 and tracked by a controller-circuit 32, as will be described in more detail below.

Referring back to FIG. 1, the system 10 also includes the controller-circuit 32 in communication with the radar-unit 20. The radar-unit 20 may be hardwired to the controller-circuit 32 through the host-vehicle's 12 electrical-system (not shown), or may communicate through a wireless network (not shown). The controller-circuit 32 may include a processor (not shown) such as a microprocessor or other control circuitry such as analog and/or digital control circuitry including an application specific integrated circuit (ASIC) for processing data as should be evident to those in the art. The controller-circuit 32 includes a memory 22, including non-volatile-memory, such as electrically-erasable-programmable read-only-memory (EEPROM) for storing one or more routines, thresholds, and captured data. The one or more routines may be executed by the processor to perform steps for detecting the objects 26 based on signals received by the controller-circuit 32 from the radar-unit 20 as described herein. The controller-circuit 32 is configured to determine that the trailer 14 is being towed by the host-vehicle 12 (i.e. determine a trailer-presence) using the known methods of zero-range-rate (ZRR) detection of targets that will be understood by those in the art.

Figure 3B:
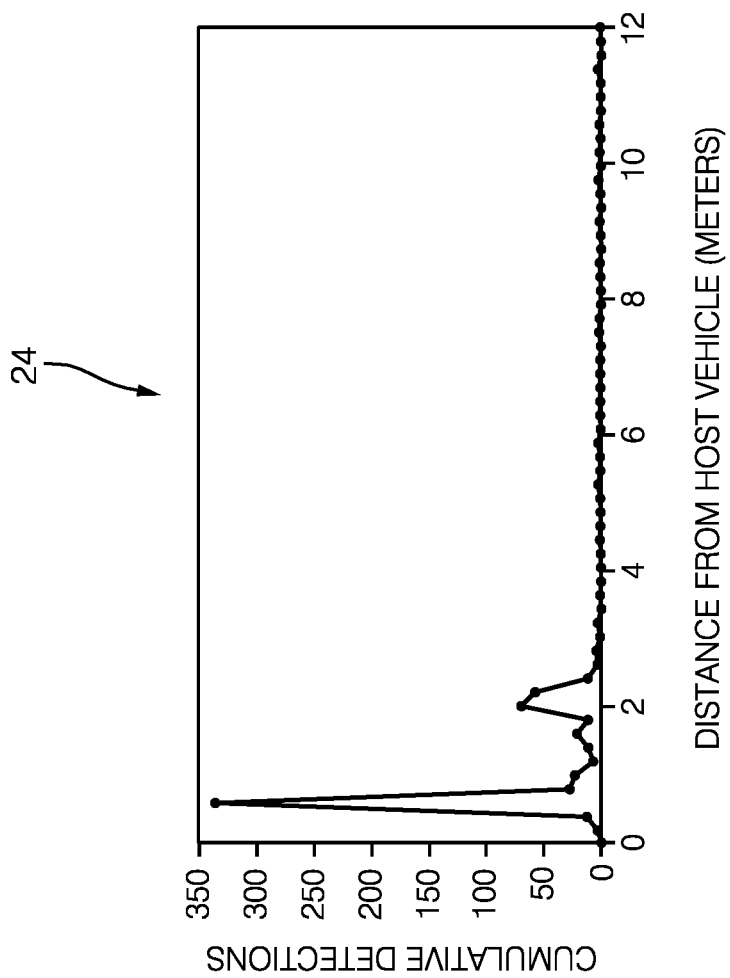
FIG. 3B is a plot of the objects of FIG. 3A in a longitudinal direction in accordance with one embodiment.
Figure 3A:
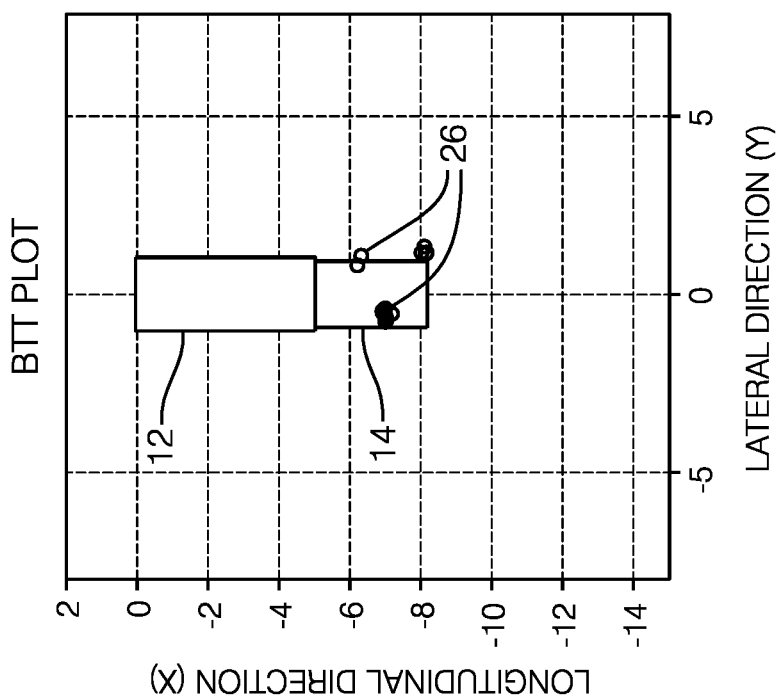
FIG. 3A is a plot of objects detected by the detection system of FIG. 1 in accordance with one embodiment.

FIG. 3A illustrates a plot of multiple radar-sensors 20A, 20B data acquisition cycles that locate the ZRR targets along a host-vehicle-longitudinal-axis 34 and a host-vehicle-lateral-axis 36. The trailer 14 has a known-trailer-length of 3.2 m. Each data acquisition cycle consists of 64-detections per radar-sensor 20A, 20B within a time interval of 50-milliseconds (50 ms), or a total of 128-detections for the two radar-sensors 20A and 20B. The origin of the plot is located at a center of the host-vehicle's 12 front-bumper (not specifically shown).

FIG. 3B illustrates a detection-distribution 24 determined by the controller-circuit 32 that is characterized by a longitudinal-distribution of ZRR detections associated with the trailer 14 towed by the host-vehicle 12. That is, the detection-distribution 24 is a plot of the groups of the ZRR targets from FIG. 3A along the host-vehicle-longitudinal-axis 34 only. Note that the x-axis for the plot in FIG. 3B is the distance 28 from a rear-end of the host-vehicle 12, and not the distance from the front-bumper as illustrated in FIG. 3A.

The controller-circuit 32 determines the detection-distribution 24 in a finite time-period, which in the examples illustrated herein, is about 1-minute in duration.

The detection-distribution 24 is characterized by groups of ZRR targets detected within sequential predetermined length-intervals extending for a predetermined-distance 38 behind the host-vehicle 12. In the examples illustrated herein, the groups represent the ZRR targets detected in increments of 0.2-meters (0.2 m) extending from the rear-end of the host-vehicle 12 for the distance 28 of up to about 12 m. For example, every 10 points along the x-axis of the plot in FIG. 3B represents 2.0 m of distance 28 from the rear-end of the 5 m long host-vehicle 12. The Y-axis in FIG. 3B represents the cumulative number of detections in a group. Some of the groups represent real-objects and others represent phantom-objects. Experimentation by the inventors has discovered that the predetermined length-intervals of less than or equal to about 0.2-meters provides an adequate balance between memory 22 utilization and accuracy of the trailer-length 16 determination. The predetermined-distance 38 of 12 m is selected as representative of a typical longest-trailer that may be legally towed on roadways by the host-vehicle 12. However, the predetermined-distance 38 may be user defined and adjusted to other distances 28 in excess of 12 m.

Referring again to FIG. 1, the controller-circuit 32 is further configured to determine a trailer-classification 42 based on a comparison of the detection-distribution 24 and longitudinal-distribution-models 44 stored in the controller-circuit 32. The trailer-classification 42 is indicative of a dimension of the trailer 14 and includes a first-class 46 (e.g. trailers 14 having a trailer-length 16 between 1 m and 4 m), a second-class 48 (e.g. trailers 14 having the trailer-length 16 between 4 m and 8 m), and a third-class 50 (e.g. trailers 14 having the trailer-length 16 between 8 m and 12 m). The longitudinal-distribution-models 44 are trained (i.e. calibrated or optimized) to determine the trailer-classification 42 using known data (i.e. training-data collected from the detection-distributions 24 of various trailers 14 with known-trailer-lengths) using a machine learning algorithm with Supervised Learning (e.g., "examples" x with "labels" y), wherein the x-training-data are the cumulative-detections at each of the predetermined length-intervals (i.e., every 0.2 m up to 12 m), and the y-training-data are the associated known-trailer-classification (i.e., first-class 46, second-class 48, and third-class 50). The machine learning algorithm creates a model based on the training-data that determines the trailer-classification 42. Any applicable machine learning algorithm may be used to develop the longitudinal-distribution-models 44. One such machine learning algorithm is the MATLAB® "fitensemble( )" by The MathWorks, Inc. of Natick, Mass., USA. The prediction of the trailer-classification 42 based on the longitudinal-distribution-models 44 and the detection-distribution 24 is executed using the MATLAB® "predict( )" function, by The MathWorks, Inc. of Natick, Mass., USA, or similarly known algorithm. In the example illustrated in FIG. 3A, the trailer 14 is classified by the system 10 as a first-class 46 trailer 14.

The controller-circuit 32 determines the trailer-length 16 based on the detection-distribution 24 and the trailer-classification 42 by applying regression-models 52 to the detection-distribution 24. The regression-models 52 are associated with each of the trailer-classifications 42 and are stored in the controller-circuit 32. Each trailer-classification 42 has associated with it a unique regression-model 52 to more accurately determine the trailer-length 16. The regression-models 52 are trained to determine the trailer-length 16 using known training-data using the same machine learning algorithm with supervised learning as described above, wherein the x-training-data are the cumulative-detections at each of the predetermined length-intervals (i.e., every 0.2 m) and the y-training-data are the associated known-trailer-lengths. The regression-models 52 are developed using the MATLAB® "fitrensemble( )" by The MathWorks, Inc. of Natick, Mass., USA, and use 50 iterations to converge on the model having an acceptable error or residual values. The controller-circuit 32 uses the detection-distribution 24 as input into the regression-model 52 to estimate or predict the trailer-length 16. The prediction of the trailer-length 16 is also executed using the MATLAB® "predict( )" function, by The MathWorks, Inc. of Natick, Mass., USA, or similarly known algorithm, based on the regression-model 52 and the detection-distribution 24.

Figure 4B:
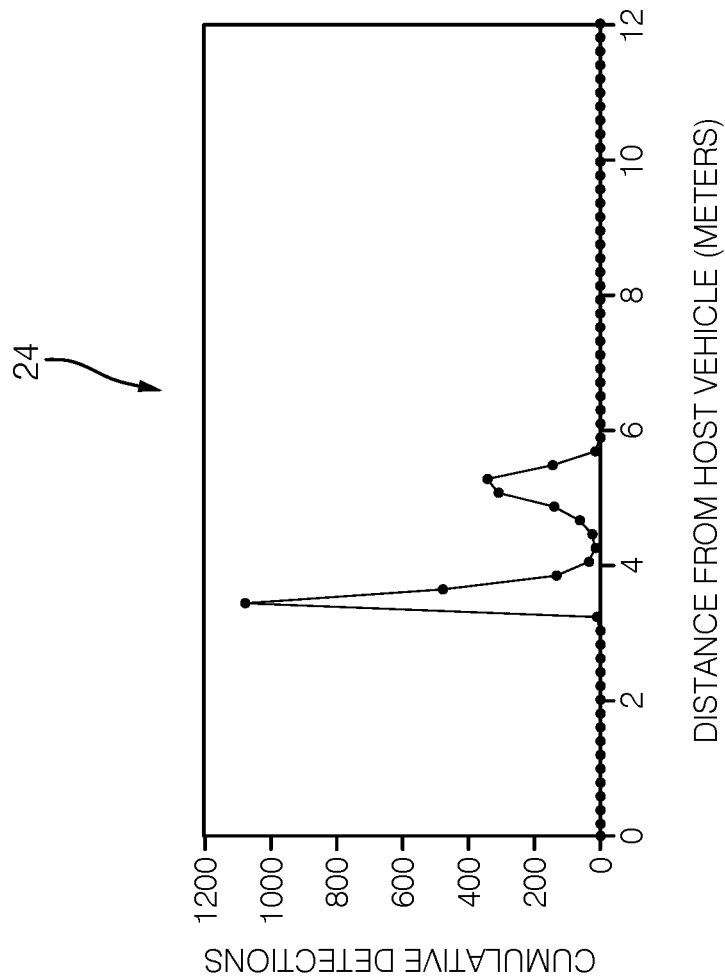
FIG. 4B is a plot of the objects of FIG. 4A in a longitudinal direction in accordance with one embodiment.
Figure 4A:
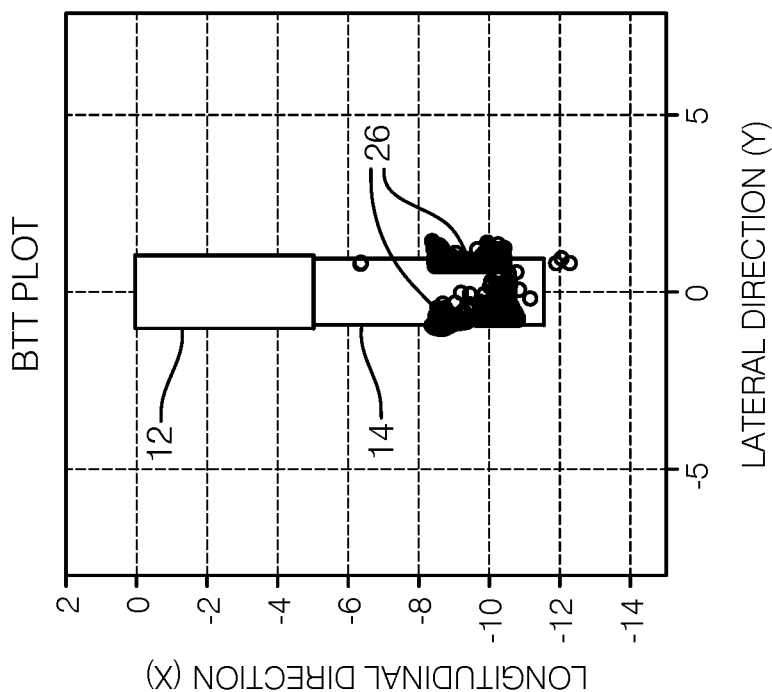
FIG. 4A is a plot of objects detected by the detection system of FIG. 1 in accordance with one embodiment.
Figure 5B:
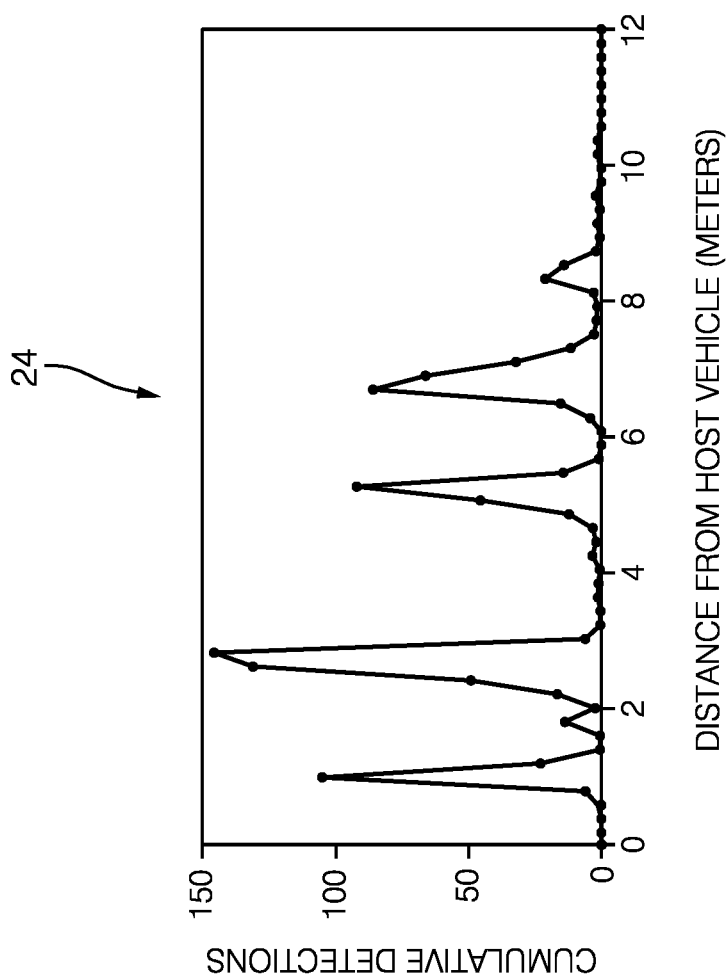
FIG. 5B is a plot of the objects of FIG. 5A in a longitudinal direction in accordance with one embodiment.
Figure 5A:
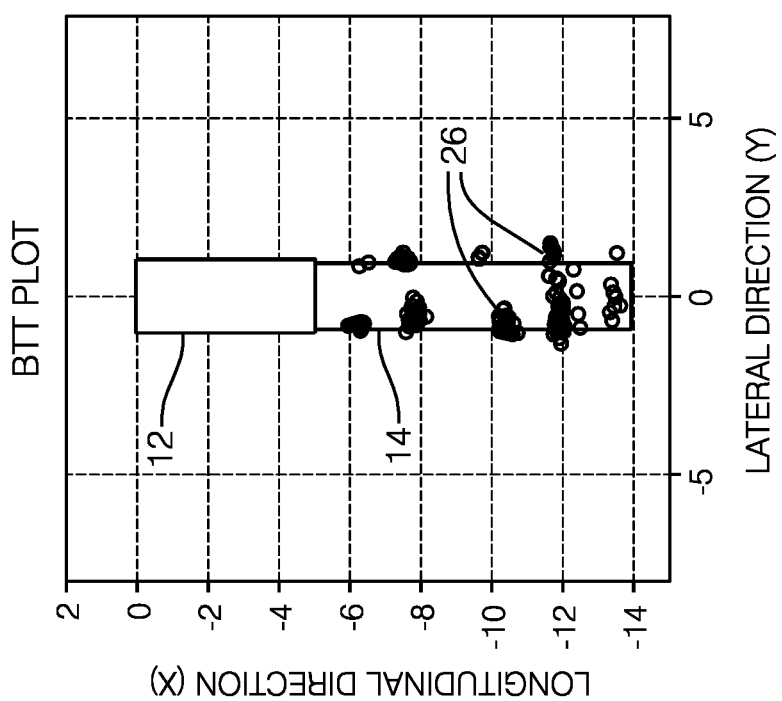
FIG. 5A is a plot of objects detected by the detection system of FIG. 1 in accordance with one embodiment.

In the example illustrated in FIG. 3B the trailer-length 16 is predicted to be 3.22 m compared to the known length of 3.20 m. FIGS. 4A-4B illustrate the trailer 14 classified as the second-class 48 with the known length of 6.60 m, and the trailer-length 16 predicted by the system 10 of 6.58 m. FIGS. 5A-5B illustrate the trailer 14 classified as the third-class 50 with the known length of 8.90 m, and trailer-length 16 predicted by the system 10 of 8.92 m. Experimentation by the inventors has discovered that the prediction of the trailer-length 16 using the above system 10 has been shown to reduce the error to less than 1.5% of the known-trailer-length.

Figure 6:
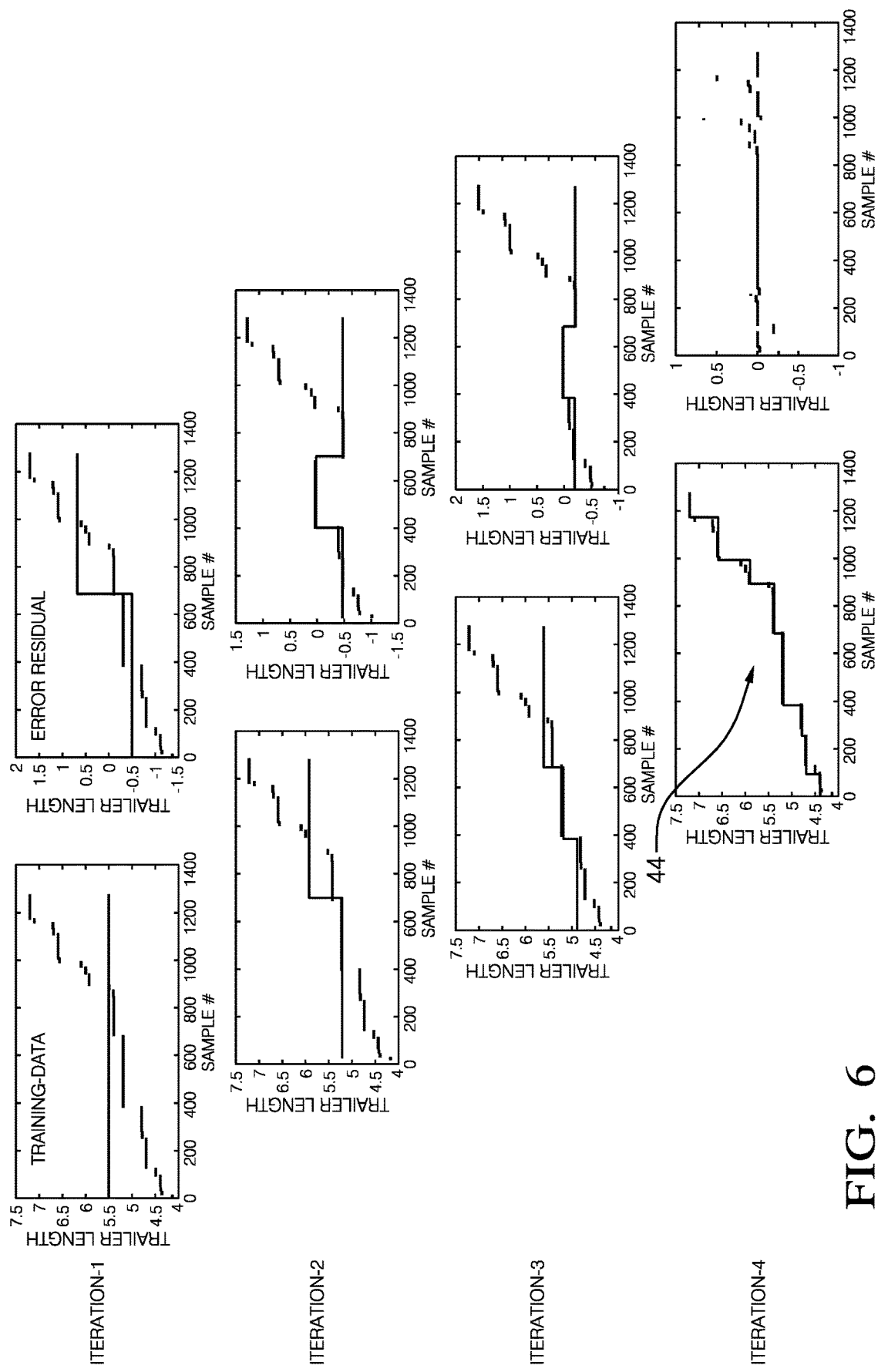
FIG. 6 is an illustration of an iterative process determining a longitudinal-distribution-model in accordance with one embodiment.

FIG. 6 illustrates an example of an iterative process for determining the longitudinal-distribution-models 44 using the MATLAB® functions described above and known training-data. Iteration-1 initially applies a linear function representing a mean value of the training-data, after which an error residual (i.e. a difference between the mean-value and the particular data-point) is calculated. The plot of the error residual from Iteration-1 is fit with a step-function which is used to update the linear function in iteration-2. The iterative process continues for N iterations (preferably N=50) until the resulting longitudinal-distribution-model 44 is characterized as having the error residual close to zero.

Figure 7:
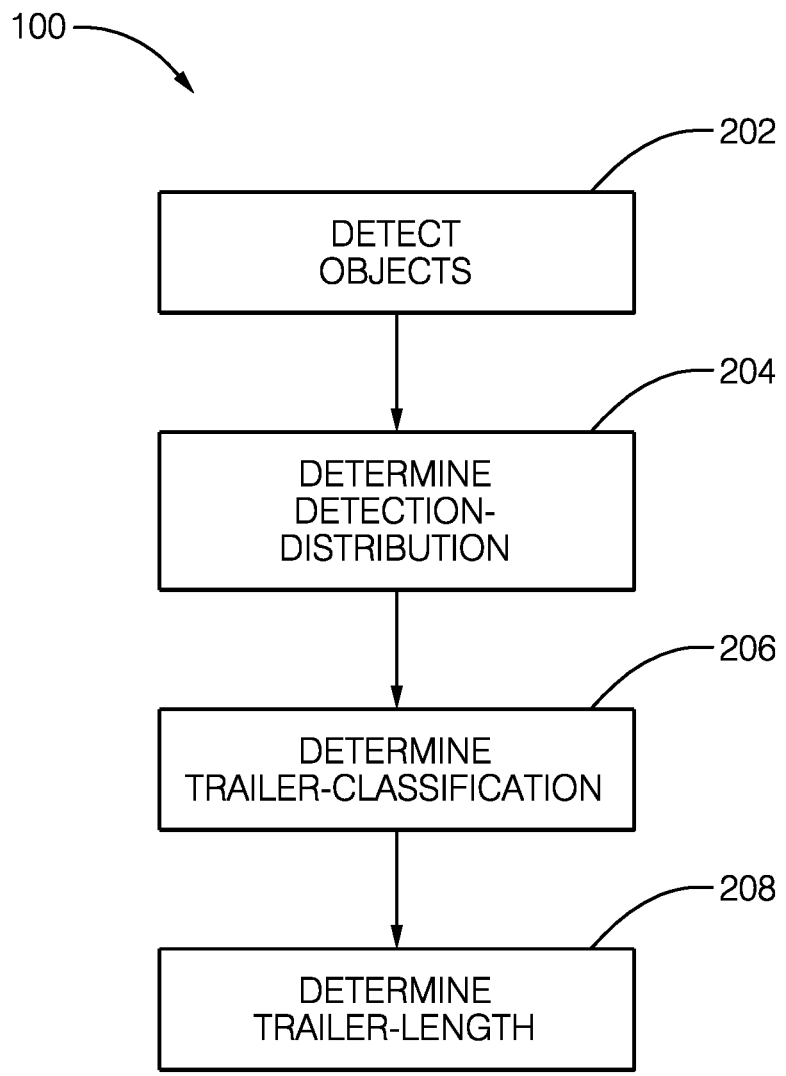
FIG. 7 is an illustration of a detection method in accordance with another embodiment.

FIG. 7 is a flow chart illustrating another embodiment of a detection method 100.

Step 102, DETECT OBJECTS, includes detecting objects 26 proximate a host-vehicle 12 with a radar-unit 20 as described above.

Step 104, DETERMINE DETECTION-DISTRIBUTION, includes determining the detection-distribution 24 based on the radar-unit 20 with the controller-circuit 32 in communication with the radar-unit 20. The detection-distribution 24 is characterized by a longitudinal-distribution of zero-range-rate detections associated with a trailer 14 towed by the host-vehicle 12. The detection-distribution 24 is determined in a finite time-period of about 1-minute. The controller-circuit 32 detects the groups of zero-range-rate detections within the sequential predetermined length-intervals extending for a predetermined-distance 38 behind the host-vehicle 12 as described above.

Step 106, DETERMINE TRAILER-CLASSIFICATION, includes determining the trailer-classification 42, with the controller-circuit 32, based on a comparison of the detection-distribution 24 and the longitudinal-distribution-models 44 stored in the controller-circuit 32. The trailer-classifications 42 include a first-class 46, a second-class 48, and a third-class 50 as described above.

Step 108, DETERMINE TRAILER-LENGTH, includes determining the trailer-length 16 of the trailer 14, with the controller-circuit 32, based on the detection-distribution 24 and the trailer-classification 42 as described above. The trailer-length 16 is determined by regression-models 52 stored in the memory 22 of the controller-circuit 32 as described above. Each trailer-classification 42 has a unique regression-model 52.

Accordingly, a detection system 10 (the system 10), a controller-circuit 32 for the system 10, and a detection method 100 are provided. The system 10 is an improvement over other detection systems because the system 10 estimates the trailer-length 16 in a time-period of less than 1-minute and reduces a measurement error.

While this invention has been described in terms of the preferred embodiments thereof, it is not intended to be so limited, but rather only to the extent set forth in the claims that follow. "One or more" includes a function being performed by one element, a function being performed by more than one element, e.g., in a distributed fashion, several functions being performed by one element, several functions being performed by several elements, or any combination of the above. It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact. The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

We claim:

1. A detection system, said system comprising:
   a radar-unit, the radar-unit configured to detect objects proximate a host-vehicle; and
   a controller-circuit in communication with the radar-unit, the controller-circuit configured to determine a detection-distribution based on the radar-unit;
   the detection-distribution characterized by a longitudinal-distribution of zero-range-rate detections associated with a trailer towed by the host-vehicle;
   the controller-circuit further configured to determine a trailer-classification based on a comparison of the detection-distribution and longitudinal-distribution-models stored in the controller-circuit;
   the trailer-classification indicative of a dimension of the trailer;
   wherein the controller-circuit determines a trailer-length of the trailer based on the detection-distribution and the trailer-classification.

2. The system in accordance with claim 1, wherein the detection-distribution is determined in a finite time-period.

3. The system in accordance with claim 2, wherein the finite time-period is about 1-minute in duration.

4. The system in accordance with claim 1, wherein the trailer-classification includes a first-class, a second-class, and a third-class.

5. The system in accordance with claim 4, wherein the first-class is indicative of trailers having a length between 1-meter and 4-meters, the second-class is indicative of trailers having the length between 4-meters and 8-meters, and the third-class is indicative of trailers having the length between 8-meters and 12-meters.

6. The system in accordance with claim 1, wherein the trailer-length is further determined by regression-models stored in the controller-circuit.

7. The system in accordance with claim 6, wherein each one of the regression-models is associated with each trailer-classification.

8. The system in accordance with claim 1, wherein the detection-distribution is characterized by groups of zero-range-rate targets detected within sequential predetermined length-intervals extending for a predetermined-distance behind the host-vehicle.

9. The system in accordance with claim 8, wherein the predetermined length-intervals are less than or equal to about 0.2-meters.

10. The system in accordance with claim 8, wherein the predetermined-distance is 12-meters.

11. A detection method, said method comprising:
    detecting objects proximate a host-vehicle with a radar-unit;
    determining a detection-distribution based on the radar-unit with a controller-circuit in communication with the radar-unit;
    the detection-distribution characterized by a longitudinal-distribution of zero-range-rate detections associated with a trailer towed by the host-vehicle;
    determining a trailer-classification, with the controller-circuit, based on a comparison of the detection-distribution and longitudinal-distribution-models stored in the controller-circuit;
    the trailer-classification indicative of a dimension of the trailer; and
    determining a trailer-length of the trailer, with the controller-circuit, based on the detection-distribution and the trailer-classification.

12. The method in accordance with claim 11, further including the step of determining the detection-distribution in a finite time-period.

13. The method in accordance with claim 11, further including the step of determining whether the trailer-classification is a first-class, a second-class, or a third-class, wherein the first-class is indicative of trailers having a length between 1-meter and 4-meters, the second-class is indicative of trailers having the length between 4-meters and 8-meters, and the third-class is indicative of trailers having the length between 8-meters and 12-meters.

14. The method in accordance with claim 11, further including the step of determining the trailer-length by regression-models stored in the controller-circuit.

15. The method in accordance with claim 11, wherein the step of determining the detection-distribution includes detecting the groups of zero-range-rate detections within sequential predetermined length-intervals extending for a predetermined-distance behind the host-vehicle.

* * * * *